United States Patent [19]

Duke

[11] Patent Number: 4,601,360

[45] Date of Patent: Jul. 22, 1986

[54] BEAM AND CHAIN HOIST FOR REMOVING VEHICLE TRANSMISSION

[76] Inventor: Steven D. Duke, 1371 Andrew Dr., Glendale, Mo. 63122

[21] Appl. No.: 635,148

[22] Filed: Jul. 27, 1984

[51] Int. Cl.⁴ .......................... B60K 5/10; B66C 7/08
[52] U.S. Cl. ..................................... 180/294; 105/363; 212/140; 254/4 R; 254/325; 414/542
[58] Field of Search ............. 180/294, 291, 298, 54.1; 280/5 R, 87.1; 212/140, 205, 213, 215; 104/126; 105/363; 414/460, 461, 541, 542; 254/4 R, 325, 326, 264; 248/675, 671

[56] References Cited

U.S. PATENT DOCUMENTS

| | | | |
|---|---|---|---|
| 2,763,218 | 9/1956 | Graham | 104/126 |
| 3,826,196 | 7/1974 | Wallace | 104/126 |
| 4,030,705 | 6/1977 | Bontrager | 254/264 |
| 4,276,952 | 7/1981 | Kuhfuss, Jr. et al. | 180/294 |

Primary Examiner—John J. Love
Assistant Examiner—Mitchell J. Hill
Attorney, Agent, or Firm—Cohn, Powell & Hind

[57] ABSTRACT

A beam and chain hoist assembly is provided including a longitudinally extending support beam having longitudinally spaced bearing surfaces adapted to engage support portions of the cab of an overland vehicle. The support beam is bifurcated at its front end to straddle the windshield post and is provided with lengthwise adjustment at its rear end. A carriage is provided having wheels adapted to move along the beam and carry the transmission longitudinally and first and second stops are provided on the beam to limit the travel of the carriage between a first position located generally above the transmission and a second position longitudinally spaced from the first position where the transmission may be removed from the cab of the vehicle. A chain hoist is suspended from the carriage including a saddle connector attachable to the transmission, and allowing it to move longitudinally, whereby an operator may raise, lower and longitudinally move the transmission with a minimal amount of effort.

8 Claims, 7 Drawing Figures

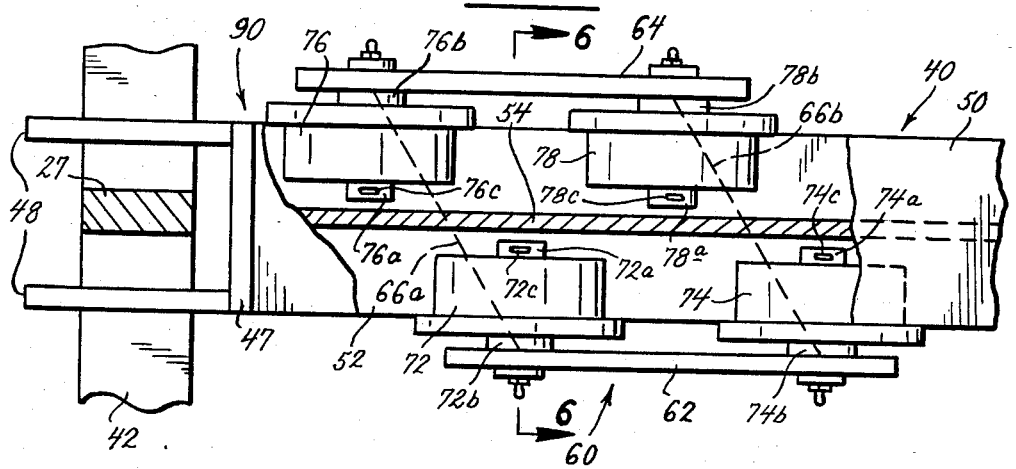
FIG. 4.
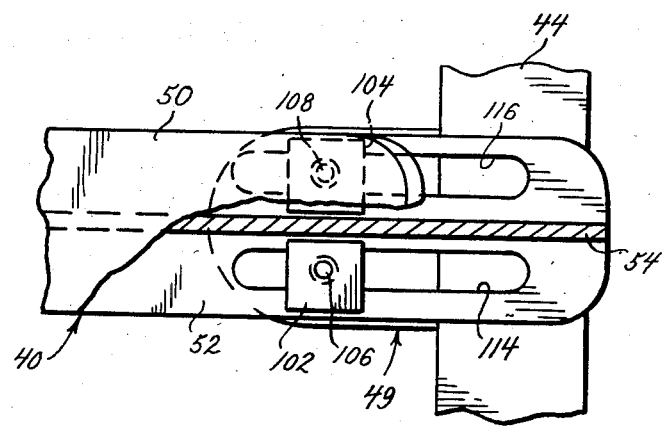
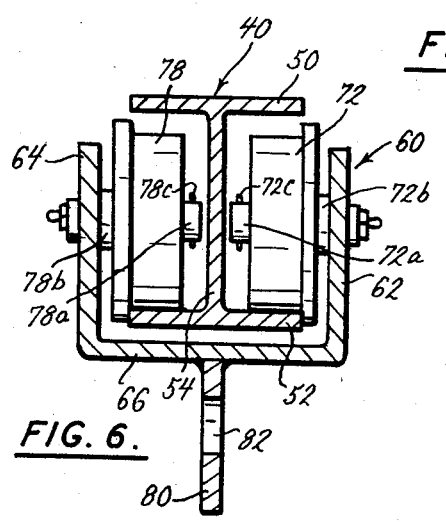
FIG. 6.
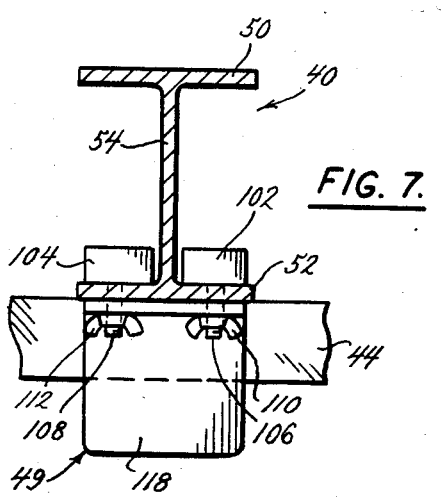
FIG. 5.
FIG. 7.

BEAM AND CHAIN HOIST FOR REMOVING VEHICLE TRANSMISSION

BACKGROUND OF THE INVENTION

This invention relates to apparatus for removing transmissions from trucks and automobiles for repair.

In particular, military vehicles which require removal of the transmission for repair have, in the past, commonly utilized an A-frame hoist located generally above the transmission which straddles the cab above the transmission. Prior to utilizing the A-frame the cab top located above the transmission must be removed. This is a time consuming and expensive process.

In situations where an A-frame is not available heavy bars have been provided which extend between the windshield area and the rear of the cab. A come-along is used to raise and lower the transmission. This is hazardous to the operator.

SUMMARY OF THE INVENTION

One object of the invention is to provide a beam and chain hoist assembly which enables removal of the transmission to be accomplished easily and conveniently wherever removal may be required and without removing the cab top.

Another object of the invention is to provide a beam and chain hoist assembly which is safer than prior practice.

In accordance with the present invention a beam and chain hoist assembly is provided including a longitudinally extending beam support having longitudinally spaced bearing means adapted to engage support portions of the cab of an overland vehicle. A carriage is provided having one or more wheels adapted to move along the beam and carry the transmission longitudinally. First and second stop means are provided on the beam to limit the travel of the carriage between a first position located generally above the location where the transmission is to be removed and a second position longitudinally spaced from the first position where the transmission may be more easily removed. A chain hoist is suspended from the carriage including gear means for raising and lowering the transmission and allowing it to move longitudinally with a minimal amount of mechanical lifting force required. The transmission is preferably provided with means for receiving the chain from the chain hoist.

The support beam is bifurcated at its front end to straddle the vehicle windshield post and is provided with adjustment means at its rear end to vary the effective length of the beam.

In the operation of the apparatus, the beam is placed in position between the cab support means; the chain hoist is connected to the transmission to be removed, the transmission disconnected from the engine and the drive shaft, and moved first longitudinally from its initial position by means of the carriage. The transmission then may be lowered vertically by means of the chain hoist to a position whereby it can be removed from the vehicle and repaired.

BRIEF DESCRIPTION OF THE DRAWINGS

FIG. 4 is a view looking in the direction of the arrows along the line 4—4 in FIG. 3 with parts broken away;

FIG. 5 is a view looking in the direction of the arrows along the line 5—5 in FIG. 3, with parts broken away;

FIG. 6 is a vertical sectional view looking in the direction of the arrows along the line 6—6 in FIG. 4.

FIG. 7 is a vertical sectional view looking in the direction of the arrows along the line 7—7 of FIG. 3.

DESCRIPTION OF THE PREFERRED EMBODIMENT

Figure 1:
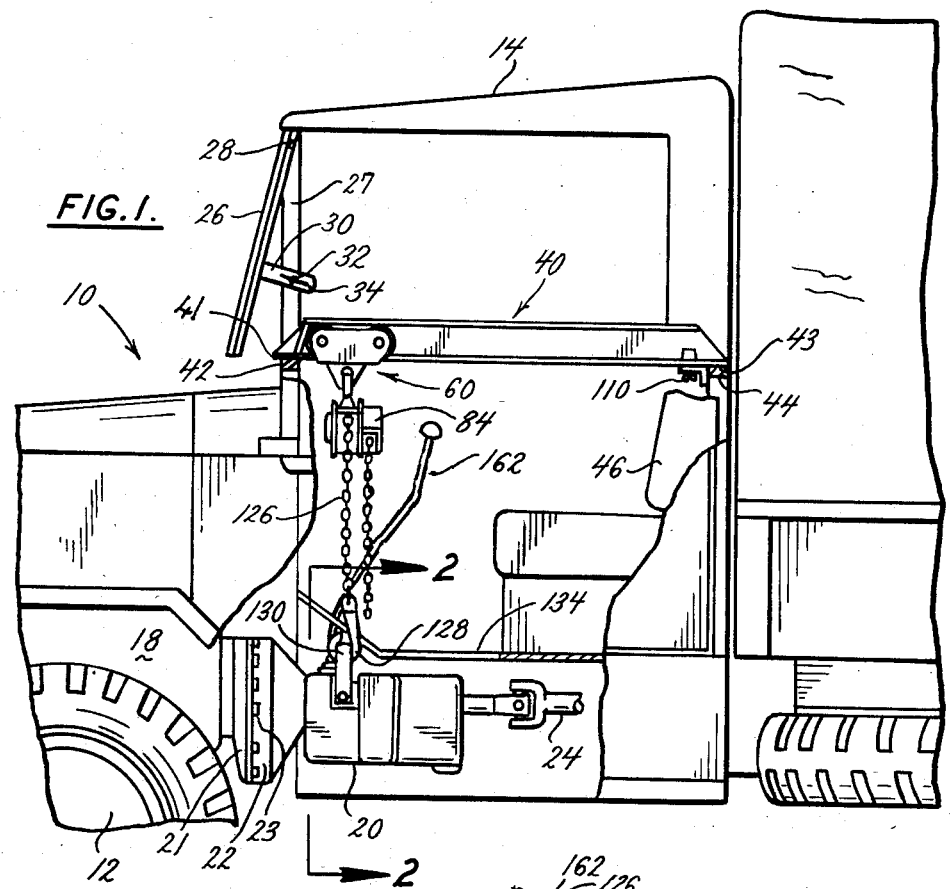
FIG. 1 is a side elevational view of a vehicle having a transmission to be removed in accordance with the present invention.

In FIG. 1 an overland truck vehicle is indicated at 10. The vehicle includes conventional wheels 12 and has a cab portion 14. A hood 16 houses an internal combustion engine 18 to which a transmission 20 is connected at one end by means of abutting flange portions 21 and 22 and removable fasteners 23. At its other end the transmission is connected to a drive shaft 24. The construction of the internal combustion engine 18, the transmission 20 and the drive shaft 24 are known in the art and form no part of the present invention.

The cab portion 14 includes a windshield 26 which is pivotally mounted to the vertical center post 27 of the windshield support frame about a transversely extending pin 28. The angularity of the windshield may be controlled by the longitudinally extending bar 30 and a suitable fastener 32 attached to the center post 27 and extending through slot 34.

In accordance with the present invention a beam support member indicated generally at 40, and having front and rear bearing surfaces 41 and 43 respectively, extends between a first supporting surface 42 located below the windshield and a second supporting surface 44 located in the rear portion 46 of the cab. See FIGS. 4 and 5. Beam bearing surfaces 42 and 44 are located generally in the transverse mid-portion of the cab. The beam 40 as shown in FIGS. 6 and 7 is generally in the shape of an "H" having an upper horizontal flange portion 50, and a lower flange portion 52. The portions 50 and 52 are joined by a vertical web 54.

The beam 40 is bifurcated at its front end to provide support on each side of the windshield center post 27. In the embodiment shown the bifurcated front end is provided by a transverse plate 47 engageable with the windshield post 27 and a pair of side members 48 which are attached, as by welding, to the beam transverse plate 47. At its rear end the beam 40 is provided with an adjustable member 49 which permits the effective length of the beam to be adjusted as will be described.

A carriage indicated at 60 is generally U or channel-shaped, as shown in FIG. 6, and includes laterally spaced vertical webs 62 and 64 joined by a transversely extending web or plate 66 having inclined ends 66a and 66b said member 62, 64 and 66 providing a carriage body portion. One set of wheels 72 and 74 are located on one side of the vertical web 54 and a second set of wheels 76 and 78 are located in staggered relation on the opposite side of the web 54. Axles 72a, 74a, 76a and 78a are provided in each respective wheel and extend into axle bearings 72b, 74b, 76b, and 78b. Cotter pins 72c, 74c, 76c and 78c hold the respective bearing members in place within the respective vertical webs 62 and 64.

Figure 3:
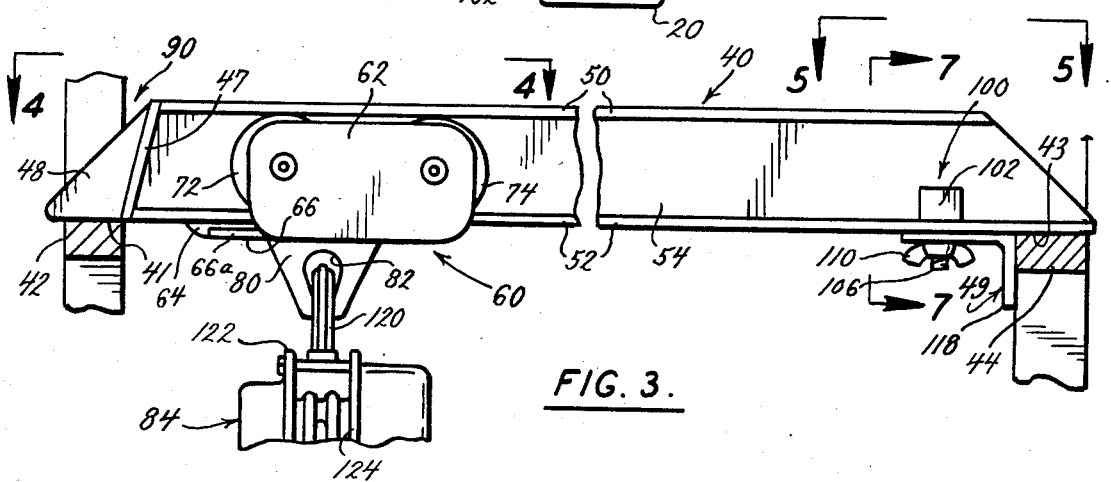
FIG. 3 is an enlarged view of the beam portion of the assembly illustrated in FIG. 1.

The beam 40 includes first stop means indicated generally at 90 which limits forward movement of the carriage 60 on the beam 40. The first stop means 90, as shown in FIGS. 3 and 4, may conveniently comprise the transversely extending plate 47 located adjacent the support 42 extending generally vertically and adapted to be engaged by one or more of the wheels 72, 74, 76 and 78. In the embodiment illustrated the plate 47 engages the wheel 76.

A second stop means at the opposite end of the beam 40 is indicated generally at 100 which limits rearward movement of the carriage 60 on the beam 40. As shown in FIG. 7, this stop means comprises a pair of lugs 102 and 104 located upon bottom plate 52 having downwardly extending studs 106 and 108 which are held in place by means of removable wing nuts 110 and 112. As shown in FIG. 5 the elongate slots 114 and 116 are provided in the horizontal flange 52 to allow adjustment of the location of the lugs 102 and 104, and the locating and positioning of the beam 40 on the particular support 44. It is apparent that when wing nuts 110 and 112 are tightened stop means 102 and 104 will prevent outward movement of the respective wheels 74 and 78 by engagement with one or more of said wheels. In the embodiment illustrated stop 102 engages the wheel 78. The front and rear stop means 90 and 100 limit movement of the carriage 60 on the beam 40 to preclude inadvertent removal of the carriage and the removable rear stop means facilitates the mounting of the carriage on the beam.

As will be readily understood the adjustable member 49 is connected to the beam 40 by means of the lugs 102 and 104 and the slots 114 and 116 thereby permit the adjustable member 49 to be positioned with its downward leg 118 engaging the support 44. As shown in FIG. 6, a vertically extending plate 80 is welded to transverse plate 66 and includes an opening 82 to receive a hoist, for example a chain hoist assembly 84. As shown in FIG. 3, hoist 84 includes a transversely extending connector in the form of a hook member 120 extending through opening 82. Member 120 is connected to a chain hoist body portion 122 which houses a chain hoist gear assembly 124 of known construction. A chain 126 providing a flexible link extends through hoist assembly 84 and is provided at its lower end with a hook member 128 adapted to engage a sling or saddle 130 attached to a transmission 20 to be removed. Saddle 130 is held in place by means of mechanical fasteners 132 (FIG. 2) connected to the transmission 24.

Figure 2:
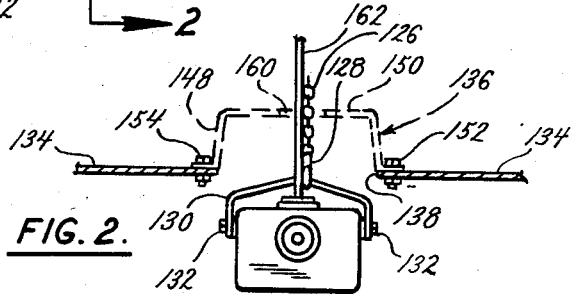
FIG. 2 is a cross sectional view looking along the direction of the arrows along the line 2—2 in FIG. 1.

As shown in FIG. 1 the cab includes a floor plate 134 having an upwardly extending removable inclined plate 136. As also shown in FIG. 2 the removable plate 136 provides a cover for an opening 138 providing access to the transmission 20. The removable plate 136 includes flange portions 142 and 144 and inclined web portions 146 and 148 joined by a transversely extending web portion 150. Mechanical fasteners 152 and 154 allow removal of the plate 136 and allow extension of the chain 126 and engagement with the saddle 130. An opening 160 is provided in the web portion 150 of sufficient size to avoid interference with a gearshift column member 162 as plate 136 is removed.

In the operation of the apparatus of the present invention, when a transmission 20 is to be removed, first the removable cover plate 136 is unbolted from the floor plate 134 by removing fasteners 152 and 154. The plate 136 is then lifted upwardly around gearshift column 162 and removed and the saddle 130 attached to the transmission. The beam 40 is then positioned on the front and rear supports 42 and 44 with the transverse plate 47 engaging the post 27 and the adjustment member 49 engaging the support 44. Then the carriage 60 is located at the first stop means location 90 in FIG. 1 and the hook member 128 is engaged with the saddle 130 on the transmission. When this has been accomplished the chain hoist 84 can be operated to lower the connecting hook 128 sufficiently to engage the saddle in readiness to taking the weight of the transmission.

The bolts 23 can then be removed to disconnect the transmission from the internal combustion engine and the drive shaft 24 is disconnected. At this time the transmission will be supported by the carriage 60 and the hoist assembly 84.

The transmission 20 is then movable longitudinally of the vehicle cab as the carriage 60 moves along beam 40. The lengthwise extent of the opening 138 is such as to permit complete disengagement of transmission so that it is possible to lower the transmission onto a transmission stand. The transmission may then be repaired.

After the transmission is repaired the hoist assembly 84 may be reconnected to the transmission saddle 130 and the transmission moved longitudinally as necessary to the extent of the opening 138, to the position of the first stop means 90. When this has been accomplished the transmission may be reconnected to the engine by replacing the bolts 26 and reconnecting the drive shaft 24. At this point the chain hoist 84 is operated to lower the hook member 128 and remove the chain 126 from connection with the saddle 130. The transmission is then ready for continued use.

Because of the staggered nature of the wheels 72, 74, 76 and 78 the weight of the transmission 20 is transferred to the beam 40 at four longitudinally spaced points which provides a more even load distribution.

The bifurcated front end of the beam 40 limits sideways movement of the beam relative to the windshield center post 27 without the need for fasteners. The simple fastener attachment at the rear end of the beam provides for adjustment of the effective length of the beam and because of the engagement between the transverse plate 47 and the windshield post 27 at the front end of the beam, and engagement between the adjustment member 49 and the support 44 at the rear end of the beam longitudinal movement of the beam is prevented.

I claim as my invention:

1. Apparatus for removing a transmission from a vehicle for repairs comprising:
    (a) longitudinally spaced first and second support means on the vehicle;
    (b) an elongate support beam having longitudinally spaced first and second end support means carried by corresponding support means on the vehicle, said beam having a lower flange providing a carriage support surface at substantially the same elevation as the corresponding support means,
    (c) a carriage having a plurality of wheels movable on said carriage support surface,
    (d) a hoist connected to said carriage below said beam and movable with said carriage, said hoist including connection means removably connectible to the transmission for moving said transmission vertically and longitudinally, and
    (e) the vehicle including a windshield post and the first vehicle support means being disposed on opposite sides of said post, and (f) the beam including a bifurcated portion to provide a post-straddling first support means to limit sideways movement of the beam.

2. Apparatus as defined in claim 1, wherein:
(g) the beam is an H section having a vertical web, and
(h) a pair of wheels are disposed on each of the opposite sides of said H beam web, the wheels on one side being staggered relative to the wheels on the other side.

3. Apparatus as defined in claim 1, wherein:
(g) the beam includes a pair of spaced side plates providing the bifurcated portion.

4. Apparatus as defined in claim 3, wherein:
(h) the support beam includes locating and positioning means including a post-engaging transversely extending plate portion at the first support means of the beam disposed between and fixedly attached to said bifurcated portion side plates.

5. Apparatus as defined in claim 4, wherein:
(i) the post-engaging plate portion provides a wheel-engageable stop means.

6. Apparatus as defined in claim 1, wherein:
(g) the support beam includes locating and positioning means including adjustable means at the second support means of the beam engageable with the second vehicle support means.

7. Apparatus as defined in claim 6, wherein:
(j) the adjustable means includes a selectively movable member attached below the support beam member lower flange, one of said members being slotted longitudinally to provide the adjustment feature.

8. Apparatus as defined in claim 7, wherein:
(k) the movable member and the beam lower flange are attached by attachment means including a lug, said lug providing a wheel-engageable stop means.

* * * * *